United States Patent
Campagna (10) Patent No.: US 9,094,471 B2
(45) Date of Patent: Jul. 28, 2015

(54) METHOD OF LAWFUL INTERCEPTION FOR UMTS

(75) Inventor: Matthew John Campagna, Ridgefield, CT (US)

(73) Assignee: Certicom Corp., Mississauga, Ontario (CA)

(*) Notice: Subject to any disclaimer, the term of this patent is extended or adjusted under 35 U.S.C. 154(b) by 0 days.

(21) Appl. No.: 13/591,898

(22) Filed: Aug. 22, 2012

(65) Prior Publication Data
US 2014/0059346 A1 Feb. 27, 2014

(51) Int. Cl.
| | |
|---|---|
| H04L 9/12 | (2006.01) |
| H04L 29/06 | (2006.01) |
| H04L 9/08 | (2006.01) |
| H04W 12/04 | (2009.01) |
| H04W 12/02 | (2009.01) |
| G06F 21/62 | (2013.01) |

(52) U.S. Cl.
CPC ............ *H04L 63/306* (2013.01); *H04L 9/0894* (2013.01); *H04W 12/02* (2013.01); *H04W 12/04* (2013.01)

(58) Field of Classification Search
CPC .. G06F 7/582; H04L 9/0822; H04L 2463/062
See application file for complete search history.

(56) References Cited

U.S. PATENT DOCUMENTS

| | | | | |
|---|---|---|---|---|
| 5,412,730 | A * | 5/1995 | Jones | 380/46 |
| 7,227,951 | B2 * | 6/2007 | Desai et al. | 380/46 |
| 2010/0217970 | A1 * | 8/2010 | Carter et al. | 713/150 |
| 2012/0272064 | A1 * | 10/2012 | Sundaram et al. | 713/171 |

FOREIGN PATENT DOCUMENTS

| | | |
|---|---|---|
| GB | 2 376 392 A | 12/2002 |
| GB | 2 390 270 A | 12/2003 |
| WO | WO 2006060410 A2 * | 6/2006 |

OTHER PUBLICATIONS

Randomness Requirement for Security. D. Eastlake. Ip.com. Jun. 1, 2005.*
Secure Key Storage Using State Machines. Li et al.IEEE(2013).*
Cryptographic Mersenne Twister and Fubuki Stream/Block Cipher. Matsumoto et al. Encrypt Stream Cipher Proposal. Jun. 1, 2005.*
The Frogbit cipher, a data interity algorithm. Moreau. Jan. 1997.*

(Continued)

*Primary Examiner* — Venkat Perungavoor
(74) *Attorney, Agent, or Firm* — Jeffrey N. Giunta; Fleit Gibbons Gutman Bongini & Bianco P.L.

(57) ABSTRACT

A method of providing, to a user equipment, first information for generating a cipher key used for encryption, and for providing, to an authorized intercept device, second information for generating the cipher key, the method including determining a generator function that, based on an input state value, outputs a next cipher key and a next state value, determining an initial state value for the generator function, providing, to the authorized intercept device, the generator function and the initial state value as the second information, generating the cipher key and a state value based on the function generator and the input state value, generating a pseudo-random value based on the cipher key, and transmitting, to the user equipment, the pseudo-random value as the first information, wherein the user equipment generates the cipher key based on the pseudo-random value.

6 Claims, 6 Drawing Sheets

(56) References Cited

OTHER PUBLICATIONS

3GPP Organizational Partners. "3$^{rd}$ Generation Partnership Project; Technical Specification Group Services and System Aspects; 3G Security; Security architecture (Release 10)" 3GPP TS 33.102 V10.0.0, (Dec. 2010).

3GPP Organizational Partners. "3$^{rd}$ Generation Partnership Project; Technical Specification Group Services and System Aspects; 3G Security; Cryptographic algorithm requirements (Release 10)" 3GPP TS 33.105 V10.0.0, (Mar. 2011).

3GPP Organizational Partners. "3$^{rd}$ Generation Partnership Project; Technical Specification Group Services and System Aspects; 3G Security; Specification of the Milenage Algorithm Set: An example algorithm set for the 3GPP authentication and key generation functions f1, f1*, f2, f4, f5 and f5*; Document 1: General (Release 10)" 3GPP TS 35.205 V10.0.0 (Mar. 2011).

International Search Report issued Oct. 30, 2013, in International Application No. PCT/US2013/055407, filed Aug. 16, 2013.

* cited by examiner

METHOD OF LAWFUL INTERCEPTION FOR UMTS

FIELD

The present disclosure generally relates to a method of lawful interception for the Universal Mobile Telecommunications System (UMTS). More specifically, the present disclosure relates to a method of lawful interception for UMTS by granting nearly message-free access to authorized entities.

BACKGROUND

The requirements for security features within the mobile communication system UMTS are specified by the 3rd Generation Partnership Project (3GPP). These security features are realized by the use of cryptographic functions and algorithms. In total, 3GPP identified the need for 9 cryptographic algorithms and functions, as described in 3GPP TS 33.102 v3.5.0: "3rd Generation Partnership Project; Technical Specification Group Services and System Aspects; 3G Security; Security Architecture" ("3GPP102"), the contents of which are incorporated herein by reference. Two of these functions, called f8 and f9, are used for cipher and integrity protection of the 3GPP radio interface, and have already been developed and are part of the 3GPP standard specifications.

The algorithms for authentication and key generation are not standardized as they can well be proprietary and chosen by each operator, as is done in GSM. The context for these algorithms, known as f1, f1*, f2, f3, f4, f5, f5*, is described in 3GPP102. The generic requirements for these algorithms are specified in 3GPP TS 33.105 v3.4.0: "3rd Generation Partnership Project; Technical Specification Group Services and System Aspects; 3G Security; Cryptographic Algorithm Requirements", which is incorporated herein by reference.

The existing sample specification and algorithm set uses AES, and is described in 3GPP TS 35.205 v10.0.0: "3rd Generation Partnership Project; Technical Specification Group Services and System Aspects; 3G Security; Specification of the MILENAGE Algorithm Set: An example algorithm set for the 3GPP authentication and key generation functions f1, f1*, f2, f3, f4, f5 and f5*" ("3GPP205"), which is incorporated herein by reference. This description has become the defacto standard within the mobile telecommunication industry. A consequence of this is that all telecommunication security is predicated on the security of AES, with little means to replace it should cryptanalysis of AES advance.

Just as the need for security features within mobile communication systems is being met, there is a corresponding need for facilitating lawful interception for authorized entities. Many carriers are burdened with such lawful intercept requirements.

BRIEF DESCRIPTION OF THE DRAWINGS

A more complete appreciation of the embodiments described herein, and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

The present disclosure describes methods that use the properties of the MILENAGE authenticated key agreement scheme to provide secure limited carrier-controlled access to an authority for the purpose of lawful intercept. Methods are defined by which nearly message-free access can be granted to authorized entities.

According to a first embodiment, there is provided a method of providing, to a user equipment, first information for generating a cipher key used for encryption, and for providing, to an authorized intercept device, second information for generating the cipher key, the method comprising determining a generator function that, based on an input state value, outputs a next cipher key and a next state value, determining an initial state value for the generator function, providing, to the authorized intercept device, the generator function and the initial state value as the second information, generating the cipher key and a state value based on the function generator and the input state value, generating a pseudo-random value based on the cipher key, and transmitting, to the user equipment, the pseudo-random value as the first information, wherein the user equipment generates the cipher key based on the pseudo-random value.

According to a second embodiment, there is provided an apparatus for providing, to a user equipment, first information for generating a cipher key used for encryption, and for providing, to an authorized intercept device, second information for generating the cipher key, the apparatus comprising a processor configured to determine a generator function that, based on an input state value, outputs a next cipher key and a next state value, and to determine an initial state value for the generator function, a cipher key generator configured to generate the cipher key and a state value based on the generator function and the input state value, a pseudo-random generator configured to generate a pseudo-random value based on the cipher key, a first communication device configured to transmit, to the user equipment, the pseudo-random value as the first information, wherein the user equipment generates the cipher key based on the pseudo-random value, and a second communication device configured to provide, to the authorized intercept device, the generator function and the initial state value as the second information.

According to a third embodiment, there is provided a method of lawful surveillance of a user equipment by an authorized intercept device, the method comprising obtaining, from a carrier authentication device, a generator function that, based on an input state value, outputs a next cipher key and a next state value, obtaining, from the carrier authentication device, an initial state value for the generator function, obtaining an encrypted message transmitted from or sent to the user equipment, generating a first cipher key and a first state value based on the obtained generator function and the obtained initial state value, and decrypting the encrypted message into a first plaintext message using the first cipher key, generating a second cipher key and a second state value using the generator function and the first cipher key, when the first plaintext message is not readable, decrypting the encrypted message into a second plaintext message using the second cipher key, when the first plaintext message is not readable, and repeating the generating and the decrypting steps to obtain subsequent cipher keys and subsequent decrypted plaintext messages until the encrypted message is decrypted into a readable plaintext form.

According to a fourth embodiment, there is provided an apparatus for lawful surveillance of a user equipment, the apparatus comprising a first communication device configured to obtain, from a carrier authentication device, a generator function that, based on an input state value, outputs a next cipher key and a next state value, and to obtain an initial state value for the generator function, a second communication device configured to obtain an encrypted message transmitted from or sent to the user equipment, a processor configured to determine a first cipher key and a first state value based on the obtained generator function and the obtained initial state value, decrypt the encrypted message into a first plaintext message, using the first cipher key, generate a second cipher key and a second state value using the generator function and the first cipher key, when the first plaintext message is not readable, decrypt the encrypted message into a second plaintext message using the second cipher key, when the first plaintext message is not readable, and repeat the generating and the decrypting steps to obtain subsequent cipher keys and subsequent decrypted plaintext messages until the encrypted message is decrypted into a readable plaintext form.

Figure 1:
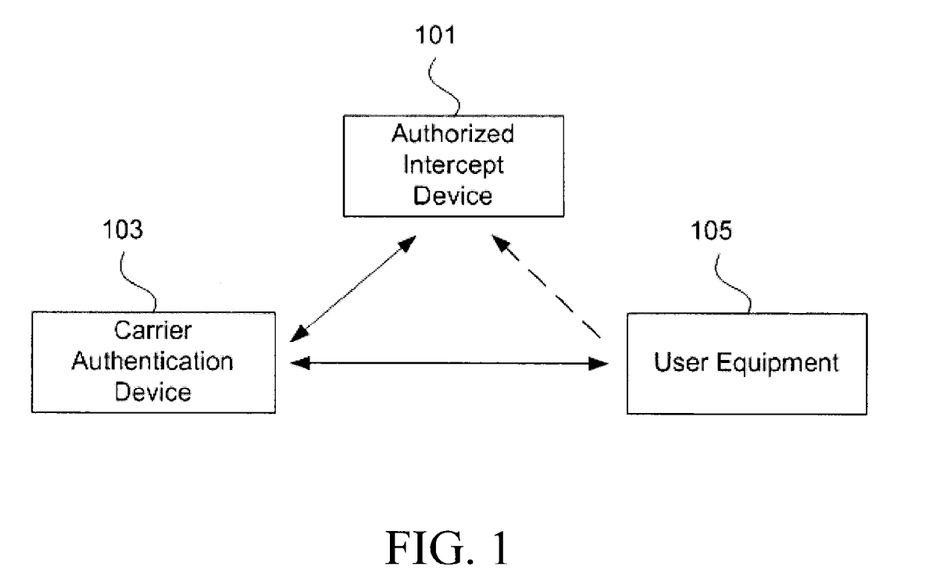
FIG. 1 shows a telecommunications system in which an authorized intercept device communicates with a carrier authentication device to obtain required information to lawfully intercept traffic from (and to) a user equipment that is in communication with the carrier authentication device.

Referring now to the drawings, wherein like reference numerals designate identical or corresponding parts throughout the several views, FIG. 1 shows a telecommunications system in which an authorized intercept device 101, i.e., a lawful intercept authority device, communicates with a carrier authentication device 103 to obtain the required information to lawfully intercept traffic from (and to) a user equipment 105, which is in communication with the carrier authentication device 103. The user equipment 105 and the carrier authentication device ("carrier") 103 use the currently deployed MILENAGE algorithm set, whose properties are used to securely synchronize keys with the authorized intercept device 101 for the purpose of lawful intercept.

The details of MILENAGE are described in 3GPP205. In MILENAGE, the user equipment 105 shares a user key K with the carrier authentication device 103. A cipher key CK used for radio access by the user equipment 105 can be computed by the carrier authentication device 103 by generating a RAND value, and then computing:

$$CK = OP_C \oplus E_K(c_3 \oplus ROTL(OP_C \oplus E_K(RAND \oplus OP_C), r_3)),$$

wherein $OP_C$ is derived from the shared user key K and an operator dependent value OP, $E_K$ is a kernel function, r3 is a fixed rotation constant, the function ROTL(N,r) rotates the value N to the left by r, and c3 is a fixed constant. Further details of the derivation of CK, including the definition of $E_K$, can be found in 3GPP205.

The carrier authentication device 103 may alternatively select a cipher key CK first, and then compute:

$$RAND = D_K(ROTR(D_K(CK \oplus OP_C) \oplus c_3, r_3) \oplus OP_C),$$

wherein $D_K$ is the inverse of $E_K$ and the function ROTR(N,r) rotates the value N to the right by r.

The carrier can then establish with the authorized intercept device 101 an initial state $S_0$ and a function $f$ having the property that:

$$(CK_{i+1}, S_{i+1}) = f(S_i).$$

f may be a deterministic random number generator that outputs random values CK suitable for cryptographic use, and updates a secret state S. An example of f is any pseudo random function or deterministic bit generator function that uses a hidden random secret state, as may be found in NIST Special Publication 800-90A ("Recommendation for Random Number Generation Using Deterministic Random Bit Generators," January, 2012), the contents of which are incorporated herein by reference.

The authorized intercept device 101 then computes and uses one of the session confidentiality keys $CK_i$ to decrypt the traffic from (and to) the user equipment 105, and test the correctness of the computed plaintext. Alignment can then be kept by iterating the state in $(CK_{i+1}, S_{i+1}) = f(S_i)$ until the correct cipher key is computed.

Figure 2:
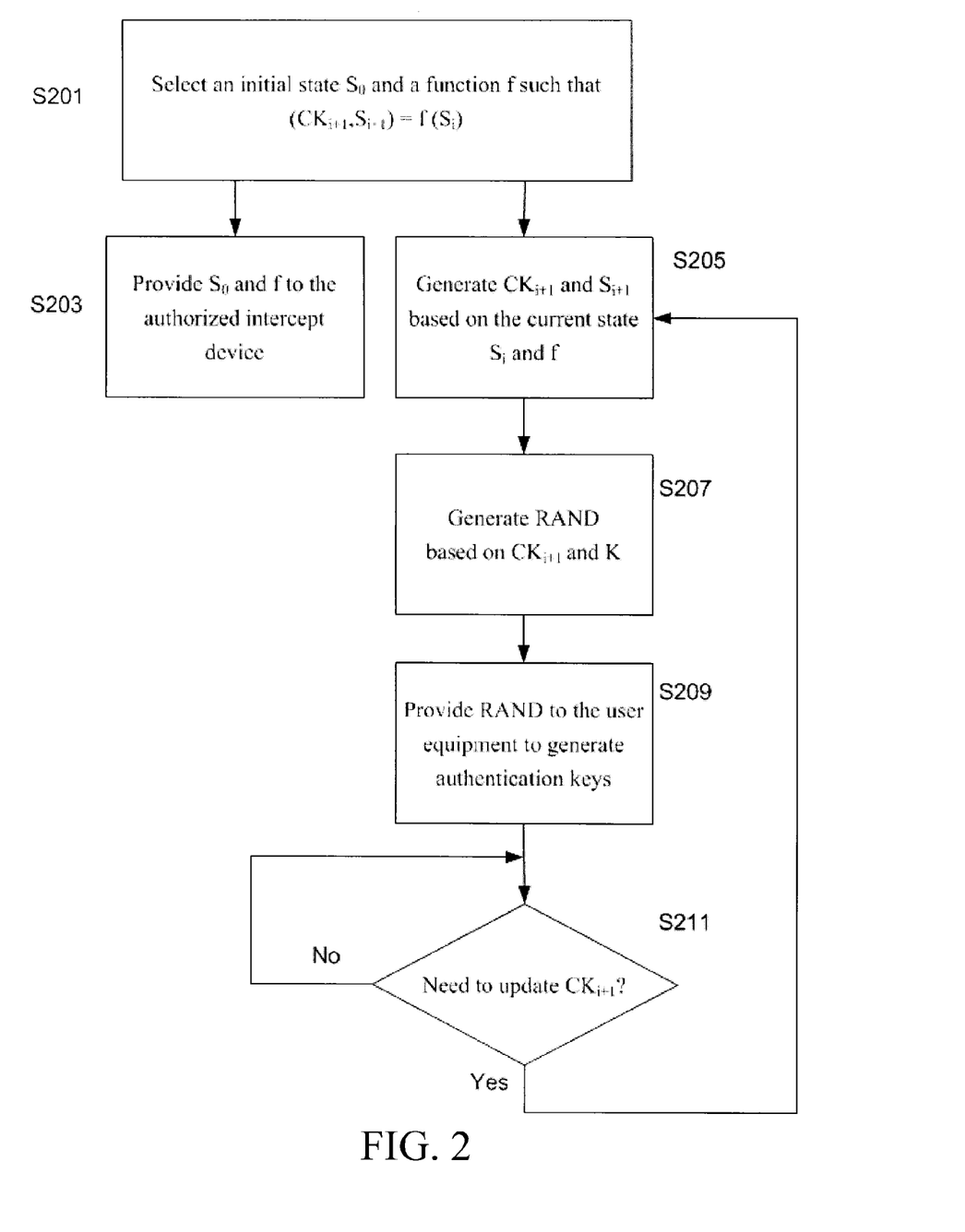
FIG. 2 shows a flowchart for a method, executed by the carrier authentication device, to provide cipher keys to an authorized intercept device.

In particular, FIG. 2 shows a flowchart for a method, executed by the carrier authentication device 103, to provide cipher keys to an authorized intercept device based on the above method.

In step S201, the carrier authentication device 103 determines the initial state $S_0$ and the function $f$.

In step S203, the carrier authentication device 103 provides the initial state $S_0$ and the function $f$ to the authorized intercept device 101. According to an embodiment of the present disclosure, providing the initial state $S_0$ and the function $f$ may be established by any secure method, including a phone conversation or a private meeting. As an example, $S_0$ may be a random hex value such as 0x9123978AB8712E129ABC67123984FD9172346A09, and f may be the deterministic random bit generator (DRBG) based on NIST SP 800-90 SHA-256, with $S_0$ as its initialization input state.

In step S205, the carrier authentication device 103 generates cipher key $CK_{i+1}$ and the next state $S_{i+1}$ based on the current state $S_i$ and f.

In step S207, the carrier authentication device 103 generates RAND based on $CK_{i+1}$ and the user key K.

In step S209, the carrier authentication device 103 provides RAND to the user equipment 105, which uses RAND to generate authentication keys, including $CK_{i+}$.

In step S211, the carrier authentication device 103 checks if $CK_{i+1}$ needs to be updated, and if the answer is yes, the process loops back to step S205 in which a new cipher key is generated. Otherwise, the process loops back to step S211. Note that the security of such a stream-based system may require $CK_{i+1}$, to be reset periodically to avoid attacks known as depth attacks. A depth attack is a classic attack on stream ciphers that occurs when a keystream is used more than once. Typically $$CT = PT \text{ xor } KS,$$

where CT is the cipher text, PT is the plaintext, and KS is the keystream. If the keystream is used twice on two different PTs, then the observer can xor the two CTs. The result is two plaintext messages xored together. Statistical properties of the plaintext can then be used to discover the content of the plaintexts.

Figure 3:
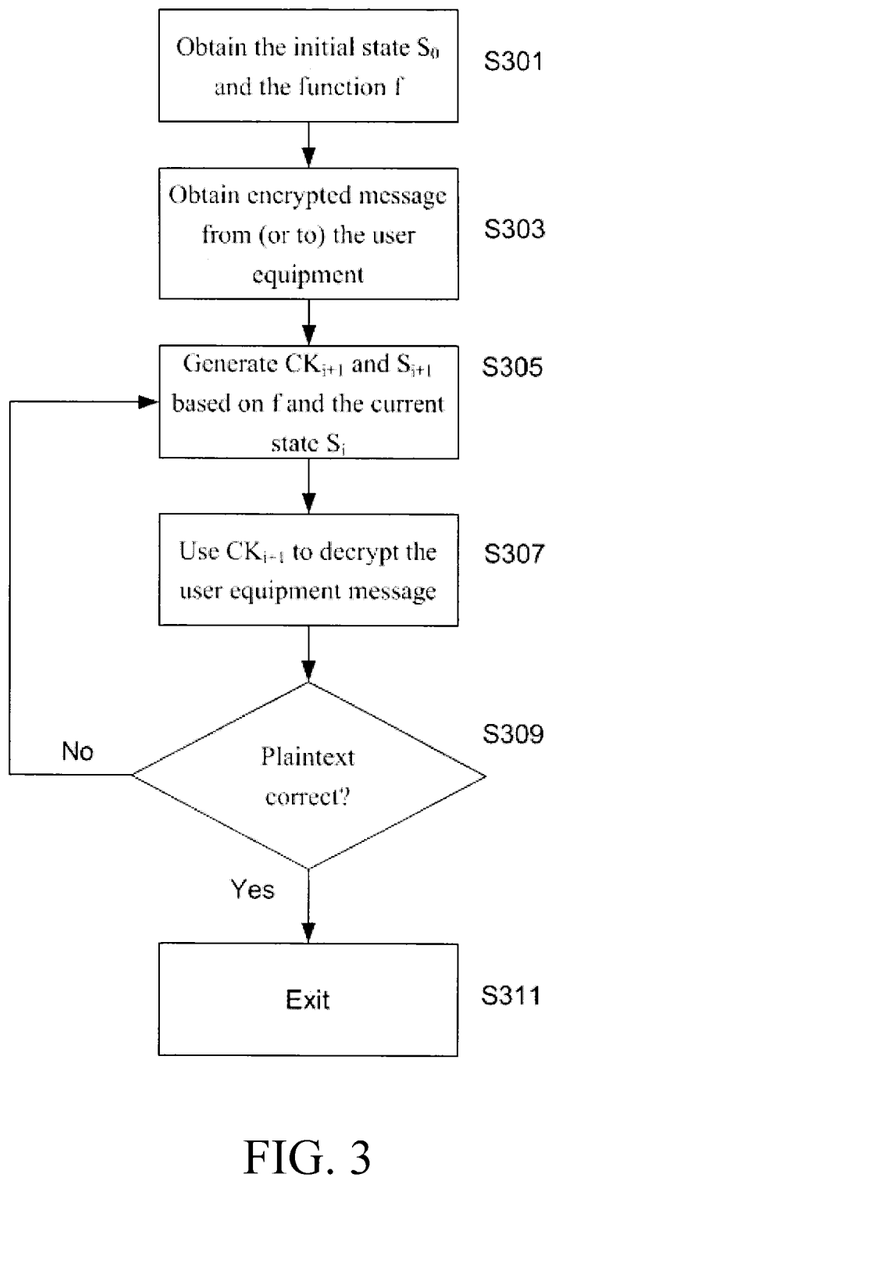
FIG. 3 shows a corresponding method of lawful interception performed by an authorized intercept device, according to one embodiment.

The carrier authentication device 103 will use the initial state $S_0$ and the function $f$ to generate session confidentiality keys $CK_i$ and provide RAND to the user equipment only during a designated time window in which interception is authorized. Before and after the designated time window, the carrier authentication device 103 will generate the session confidentiality keys $CK_i$ in an alternative manner unknown to the authorized intercept device 101. Thus, the authorized intercept device 101 can compute and use the session confidentiality keys $CK_i$ to decrypt the user equipment's traffic only during the designated time window. FIG. 3 shows a corresponding method of lawful interception performed by the authorized intercept device 101, according to one embodiment.

In step S301, the authorized intercept device 101 contacts the carrier authentication device 103 and obtains the initial state $S_0$ and the function $f$, which are needed to generate a cipher key so as to enable surveillance of the user equipment 105. Alternatively, the initial state $S_0$ and the function $f$ are automatically transmitted to the authorized intercept device 101.

In step S303, the authorized intercept device 101 obtains at least one encrypted message transmitted from (or to) the user equipment 105. Note that step S303 may be performed before step S301.

In step S305, the authorized intercept device 101 generates the values $CK_{i+1}$ and $S_{i+1}$ based on f and the current state $S_i$.

In step S307, the authorized intercept device 101 uses $CK_{i+1}$ to decrypt the message obtained in step S303 to generate a plaintext message.

In step S309, the authorized intercept device 101 checks for alignment of the generated cipher key $CK_{i+1}$ by checking the readability of the plaintext message resulting from the decryption in step S307. If the plaintext is not readable, the process loops back to state S305 to iterate the state $S_i$ and to compute a new cipher key $CK_{i+1}$. Otherwise, the process exits in step S311. The above process can be repeated for additional intercepted messages.

The above method may be expanded to use a keyed mechanism for a lawful intercept, with key KLI. The function $f$ then takes the key KLI as an extra input:

$$(CK_{i+1}, S_{i+1}) = f(KLI, S_i).$$

In this embodiment, the hidden state may not be required to be secret and independently agreed upon between the authorized intercept device 101 and the carrier authentication device 103, but may be a counter or a symmetric key-based key derivation function KDF.

Figure 4:
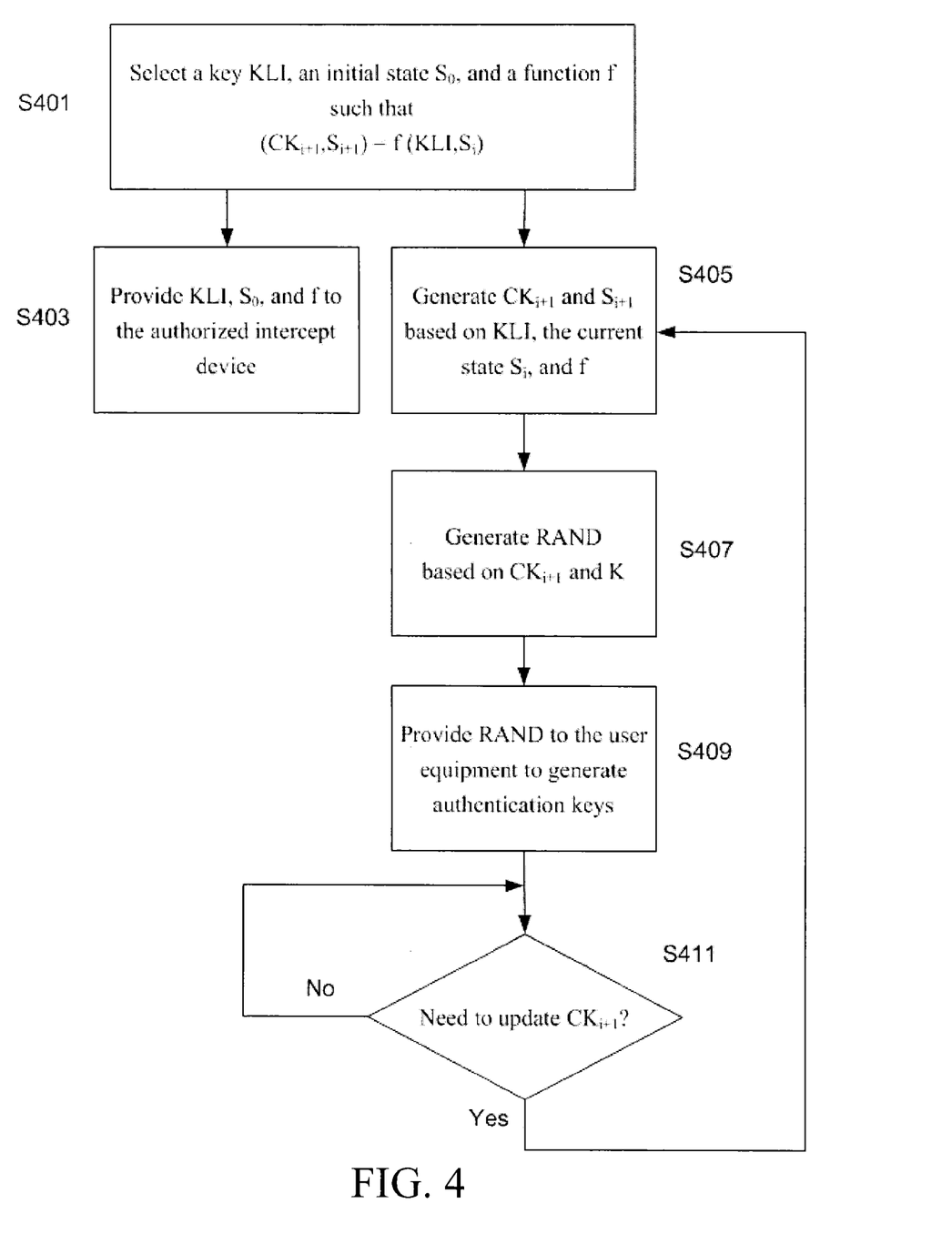
FIG. 4 shows a flowchart according to a second method, executed by the carrier authentication device, to provide cipher keys to an authorized intercept device.

In particular, FIG. 4 shows a flowchart according to a second method, executed by the carrier authentication device 103, to provide cipher keys to an authorized intercept device based on the second method.

In step S401, the carrier authentication device 103 determines a key KLI, the initial state $S_0$, and the function $f$.

In step S403, the carrier authentication device 103 provides the key KLI, the initial state $S_0$, and the function $f$ to the authorized intercept device 101.

In step S405, the carrier authentication device 103 generates cipher key $CK_{i+1}$ and the next state $S_{i+1}$ based on the key KLI, the current state $S_i$, and f.

In step S407, the carrier authentication device 103 generates RAND based on $CK_{i+1}$ and the user key K.

In step S409, the carrier authentication device 103 provides RAND to the user equipment 105, which uses RAND to generate authentication keys, including $CK_{i+1}$.

In step S411, the carrier authentication device 103 checks if $CK_{i+1}$ needs to be updated, and if the answer is yes, the process loops back to step S405. Otherwise, the process loops back to step S411.

Figure 5:
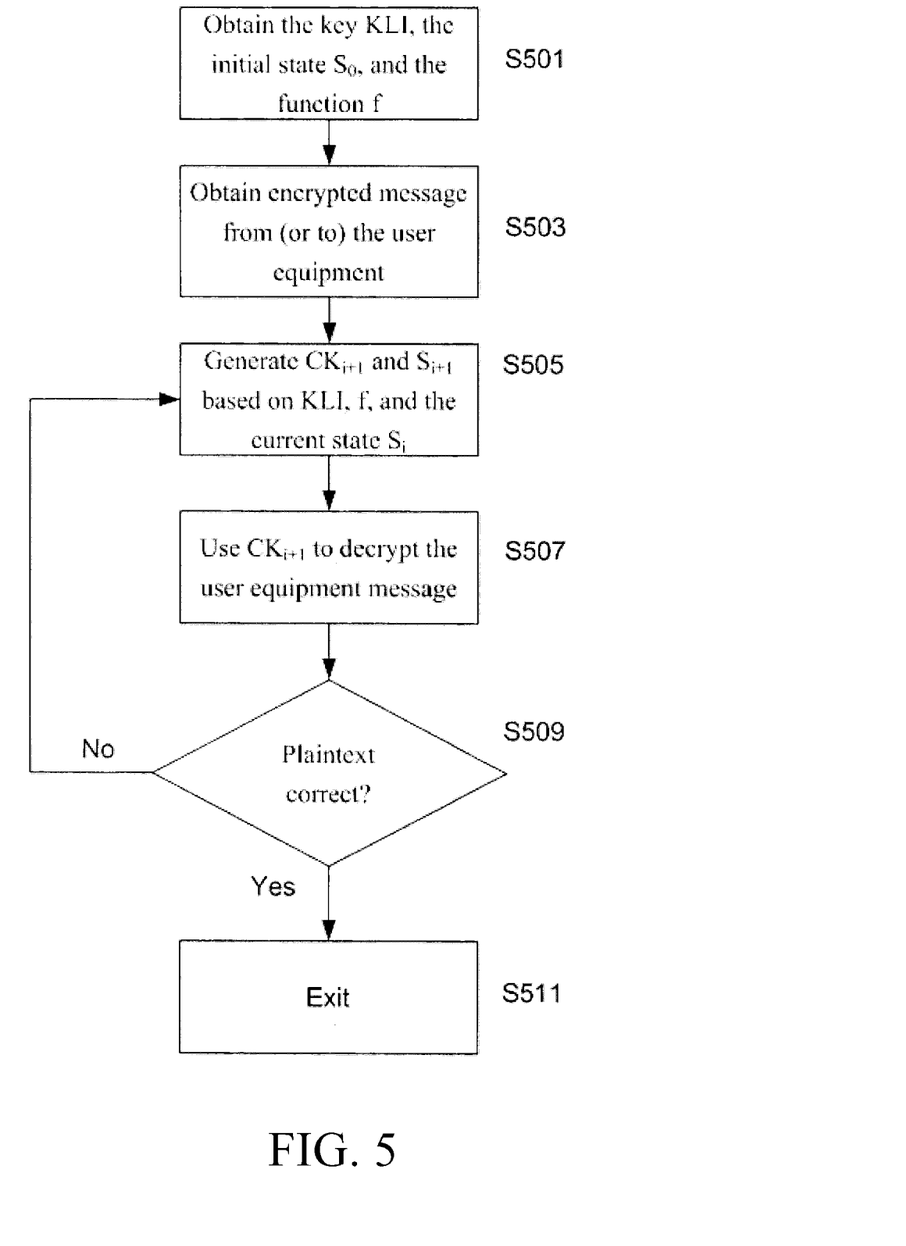
FIG. 5 shows a corresponding method of lawful interception performed by an authorized intercept device, according to another embodiment.

FIG. 5 shows a corresponding method of lawful interception performed by the authorized intercept device 101, according to another embodiment.

In step S501, the authorized intercept device 101 contacts the carrier authentication device 103 and obtains the key KLI, the initial state $S_0$, and the function $f$, which are needed to generate a cipher key so as to enable surveillance of the user equipment 105.

In step S503, the authorized intercept device 101 obtains an encrypted message transmitted from (or to) the user equipment 105. Note that step S503 may be performed before step S501.

In step S505, the authorized intercept device 101 generates the values $CK_{i+1}$, and $S_{i+1}$ based on KLI, f, and the current state $S_i$.

In step S507, the authorized intercept device 101 uses $CK_{i+1}$ to decrypt the message obtained in step S503 to generate a plaintext message.

In step S509, the authorized intercept device 101 checks for alignment of the generated cipher key $CK_{i+1}$ by checking the correctness of the plaintext message resulting from the decryption in step S507. If the plaintext is not correct, the process loops back to state S505 to iterate the state $S_i$ and to compute a new cipher key $CK_{i+1}$. Otherwise, the process exits in step S511.

In the above embodiments, a benefit provided by the properties of MILENAGE is that, with mutual knowledge of the stepping function $f$ and the current state $S_i$, no additional communication is needed to provide lawful access to the authorized intercept device 101 to the confidentiality keys $CK_i$ used by the user equipment 105.

Figure 6:
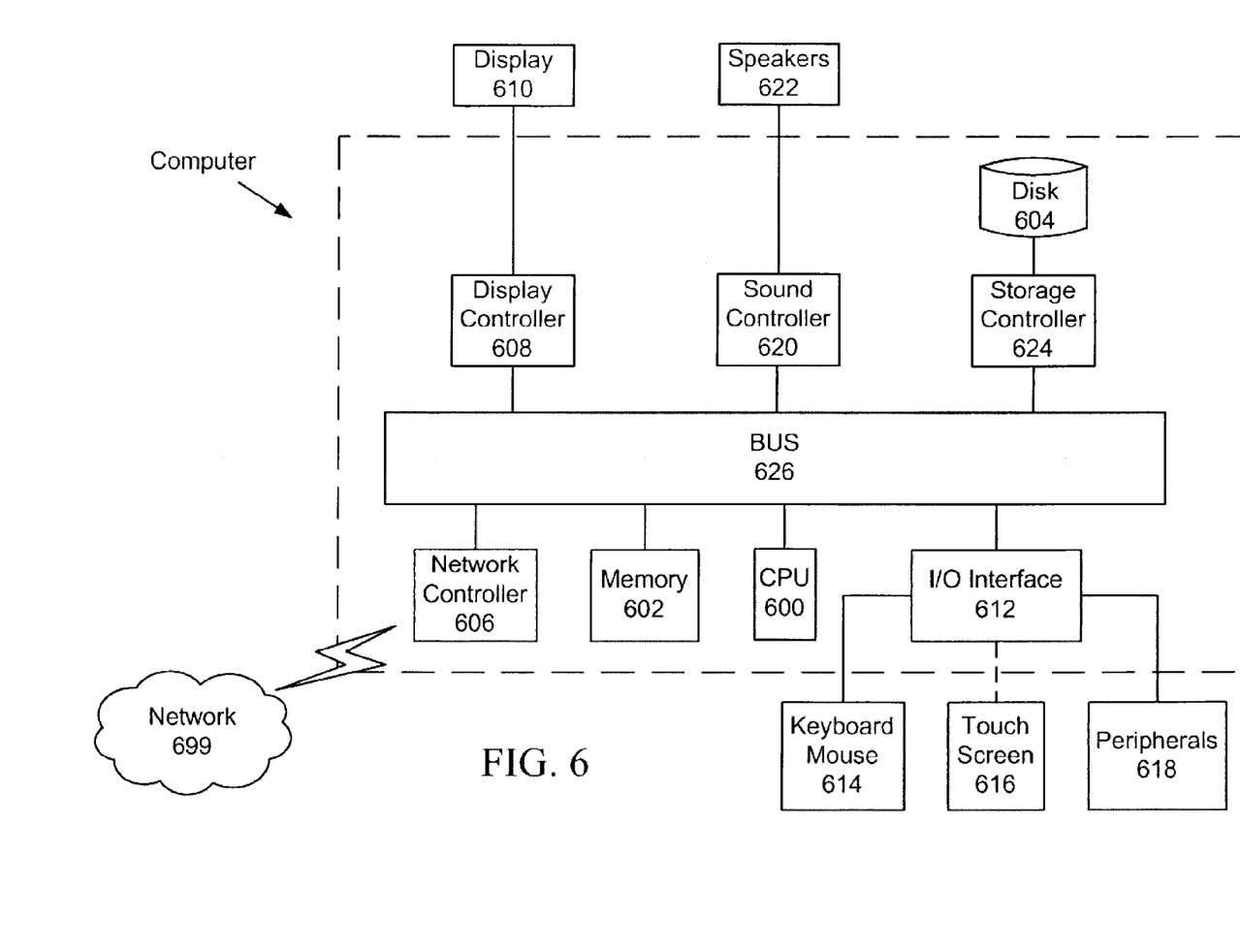
FIG. 6 shows a block diagram of a computer according to exemplary embodiments.

Both the carrier authentication device 103 and the authorized intercept device 101 can be implemented by one or more computers and/or one or more specialized circuits. A hardware description of such a computer is described with reference to FIG. 6. In FIG. 6, the computer includes a CPU 600 which may perform the processes described above. The process data and instructions may be stored in memory 602. These processes and instructions may also be stored on a storage medium disk 604 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computer communicates, such as a server.

Further, the claimed advancements may be provided as a utility application, background daemon, or component of an operating system, or combination thereof, executing in conjunction with CPU 600 and an operating system such as Microsoft Windows 7, UNIX, Solaris, LINUX, Apple MAC-OS and other systems known to those skilled in the art.

CPU 600 may be a Xenon or Core processor from Intel of America or an Opteron processor from AMD of America, or may be other processor types that would be recognized by one of ordinary skill in the art. Alternatively, the CPU 600 may be implemented on an FPGA, ASIC, PLD or using discrete logic circuits, as one of ordinary skill in the art would recognize. Further, CPU 600 may be implemented as multiple processors cooperatively working in parallel to perform the instructions of the inventive processes described above.

The computer in FIG. 6 also includes a network controller 606, such as an Intel Ethernet PRO network interface card from Intel Corporation of America, for interfacing with network 699. As can be appreciated, the network 699 can be a public network, such as the Internet, or a private network such as an LAN or WAN network, or any combination thereof and can also include PSTN or ISDN sub-networks. The network 699 can also be wired, such as an Ethernet network, or can be wireless such as a cellular network including EDGE, 3G and 4G wireless cellular systems. The wireless network can also be WiFi, Bluetooth, or any other wireless form of communication that is known.

One embodiment of the computer may be used by the carrier authentication device 103. In this embodiment, the network controller 606 may be used to communicate with the authorized intercept device 101 and the user equipment 105.

Another embodiment of the computer may be used by the authorized intercept device 101. In this embodiment, the network controller 606 may be used to communicate with the carrier authentication device 103 and the user equipment 105.

The computer further includes a display controller 608, such as a NVIDIA GeForce GTX or Quadro graphics adaptor from NVIDIA Corporation of America for interfacing with display 610, such as a Hewlett Packard HPL2445w LCD monitor. A general purpose I/O interface 612 interfaces with a keyboard and/or mouse 614 as well as a touch screen panel 616 on or separate from display 610. General purpose I/O interface also connects to a variety of peripherals 618 including printers and scanners, such as an OfficeJet or DeskJet from Hewlett Packard.

A sound controller 620 is also provided in the computer, such as Sound Blaster X-Fi Titanium from Creative, to interface with speakers/microphone 622 thereby providing sounds and/or music. The speakers/microphone 622 can also be used to accept dictated words as commands for controlling the computer or for providing location and/or property information with respect to the target property.

The general purpose storage controller 624 connects the storage medium disk 604 with communication bus 626, which may be an ISA, EISA, VESA, PCI, or similar, for interconnecting all of the components of the computer. A description of the general features and functionality of the display 610, keyboard and/or mouse 614, as well as the display controller 608, storage controller 624, network controller 606, sound controller 620, and general purpose I/O interface 612 is omitted herein for brevity as these features are known.

In the above description, any processes, descriptions or blocks in flowcharts should be understood to represent modules, segments, or portions of code that include one or more executable instructions for implementing specific logical functions or steps in the process, and alternate implementations are included within the scope of the exemplary embodiments of the present advancements in which functions may be executed out of order from that shown or discussed, including substantially concurrently or in reverse order, depending upon the functionality involved, as would be understood by those skilled in the art.

While certain embodiments have been described, these embodiments have been presented by way of example only, and are not intended to limit the scope of the inventions. Indeed, the novel methods, apparatuses and systems described herein may be embodied in a variety of other forms; furthermore, various omissions, substitutions and changes in the form of the methods, apparatuses and systems described herein may be made without departing from the spirit of the inventions. The accompanying claims and their equivalents are intended to cover such forms or modifications as would fall within the scope and spirit of the inventions.

The invention claimed is:

1. A computer-implemented method of providing, by a carrier authentication device to a user equipment, first information for generating a cipher key used for encryption, and for providing, by the carrier authentication device to an authorized intercept device, second information for generating the cipher key, wherein the authorized intercept device, the carrier authentication device, and the user equipment are distinct devices communicatively coupled to a network, the method comprising:

determining a generator function that, based only on an input state value, outputs a next cipher key and a next state value, the next cipher key and the next state value being different from each other;

determining an initial state value for the generator function;

providing, to the authorized intercept device, the generator function and the initial state value as the second information;

generating, by the carrier authentication device using the generator function, the cipher key and a state value based only on the input state value;

generating a first pseudo-random value based on the cipher key;

transmitting, to the user equipment only during a designated time period during which lawful interception is authorized, the first pseudo-random value as the first information, wherein the user equipment generates the cipher key based on the first pseudo-random value;

generating a second pseudo-random value based upon session confidentiality keys in a manner different than is used for generating the first pseudo-random value; and transmitting, to the user equipment at times other than the designated time period during which lawful interception is authorized, the second pseudo-random value as the first information, wherein the user equipment generates the cipher key based on the second pseudo-random value.

2. The method of claim 1, further comprising:

generating, using the generator function, a new cipher key and a new state value based only on the state value;

generating a new pseudo-random value based on the new cipher key; and transmitting, without providing further information to the authorized intercept device, the new pseudo-random value to the user equipment, wherein the user equipment generates the new cipher key based on the new pseudo-random value.

3. A carrier authentication device for providing, to a user equipment, first information for generating a cipher key used for encryption, and for providing, to an authorized intercept device, second information for generating the cipher key, wherein the authorized intercept device, the carrier authentication device, and the user equipment are distinct devices communicatively coupled to a network, the carrier authentication device comprising:

a processor configured to determine a generator function that, based only on an input state value, outputs a next cipher key and a next state value, and to determine an initial state value for the generator function, the next cipher key and the next state value being different from each other;

a cipher key generator configured to generate, using the generator function, the cipher key and a state value based only on the input state value;

a pseudo-random generator configured to generate a first pseudo-random value based on the cipher key;

a first communication device configured to transmit, to the user equipment only during a designated time period during which lawful interception is authorized, the first pseudo-random value as the first information, wherein the user equipment generates the cipher key based on the first pseudo-random value;
a second communication device configured to provide, to the authorized intercept device, the generator function and the initial state value as the second information;
the cipher key generator further configured to generate a second pseudo-random value based upon session confidentiality keys in a manner different than is used for generating the first pseudo-random value; and
the first communication device further configured to transmit, to the user equipment at times other than the designated time period during which lawful interception is authorized, the second pseudo-random value as the first information, wherein the user equipment generates the cipher key based on the second pseudo-random value.

4. A method of lawful surveillance of a user equipment by an authorized intercept device, the method comprising:
obtaining, from a carrier authentication device, a generator function that, based only on an input state value, outputs a next cipher key and a next state value, the next cipher key and the next state value being different from each other. wherein the authorized intercept device, the carrier authentication device, and the user equipment are distinct devices communicatively coupled to a network;
obtaining, from the carrier authentication device, an initial state value for the generator function;
obtaining an encrypted message transmitted from or sent to the user equipment;
generating, using the obtained generator function, a first cipher key and a first state value based only on the obtained initial state value;
decrypting the encrypted message into a first plaintext message using the first cipher key;
determining that the first plaintext message is readable; and
upon a determination that that the first plaintext message is not readable, repeating the following until a determination that a subsequent plaintext message is readable:
generating, using the generator function, a subsequent cipher key and a subsequent state value based only on the first cipher key;
decrypting the encrypted message into the subsequent plaintext message using the subsequent cipher key; and
determining that the subsequent plaintext message is readable.

5. An authorized intercept device for lawful surveillance of a user equipment, the authorized intercept device comprising:
a first communication device configured to obtain, from a carrier authentication device, a generator function that, based only on an input state value, outputs a next cipher key and a next state value, and to obtain an initial state value for the generator function, the next cipher key and the next state value being different from each other, wherein the authorized intercept device, the carrier authentication device, and the user equipment are distinct devices communicatively coupled to a network;
a second communication device configured to obtain an encrypted message transmitted from or sent to the user equipment;
a processor configured to:
determine, using the obtained generator function, a first cipher key and a first state value based only on the obtained initial state value,
decrypt the encrypted message into a first plaintext message, using the first cipher key;
determine that the first plaintext message is readable; and
upon a determination that that the first plaintext message is not readable, repeat the following until a determination that a subsequent plaintext message is readable:
generate, using the generator function, a subsequent cipher key and a subsequent state value based only on the first cipher key;
decrypt the encrypted message into the subsequent plaintext message using the subsequent cipher key; and
determine that the subsequent plaintext message is readable.

6. A non-transitory computer-readable medium storing a program that, when executed by a processor of a carrier authentication device, causes the processor to perform a method of providing, to a user equipment, first information for generating a cipher key used for encryption, and for providing, to an authorized intercept device, second information for generating the cipher key, wherein the authorized intercept device, the carrier authentication device, and the user equipment are distinct devices communicatively coupled to a network, the method comprising:
determining a generator function that, based only on an input state value, outputs a next cipher key and a next state value, the next cipher key and the next state value being different from each other;
determining an initial state value for the generator function;
providing, to the authorized intercept device, the generator function and the initial state value as the second information;
generating, using the generator function, the cipher key and a state value based only on the input state value;
generating a first pseudo-random value based on the cipher key;
transmitting, to the user equipment only during a designated time period during which lawful interception is authorized, the first pseudo-random value as the first information, wherein the user equipment generates the cipher key based on the first pseudo-random value;
generating a second pseudo-random value based upon session confidentiality keys in a manner different than is used for generating the first pseudo-random value; and
transmitting, to the user equipment at times other than the designated time period during which lawful interception is authorized, the second pseudo-random value as the first information, wherein the user equipment generates the cipher key based on the second pseudo-random value.

* * * * *